United States Patent [19]
Legardinier

[11] 3,863,536
[45] Feb. 4, 1975

[54] CUTTING GUIDE FOR MACHINES FOR PRODUCING RODS, PARTICULARLY FOR CIGARETTE MACHINES

[75] Inventor: Andre Legardinier, Plessis Bouchard, France

[73] Assignee: Usines Decoufle, Paris, France

[22] Filed: Sept. 7, 1973

[21] Appl. No.: 395,050

[30] Foreign Application Priority Data
Sept. 7, 1972  France .............................. 72.31709

[52] U.S. Cl. ........................ 83/299, 83/310, 83/327
[51] Int. Cl. ........................ B26d 1/56, B23d 25/02
[58] Field of Search ............. 83/299, 310, 311, 327, 83/331

[56] References Cited
UNITED STATES PATENTS
3,440,912  4/1969  Verjux .................................. 83/310
3,728,923  4/1973  Lanore ............................. 83/310 X
3,760,672  9/1973  Labee et al. .......................... 83/310

Primary Examiner—Willie G. Abercrombie
Attorney, Agent, or Firm—Amster & Rothstein

[57] ABSTRACT

This cutting device is of the type moving while remaining constantly parallel to itself and perpendicular to the cigarette rod, by turning about an axis at a uniform tangential speed equal to the speed of travel of the rod. The cutting guide 5-6 is fixed to the end of a shaft 8 turning freely in an eccentric bore provided in a plate 3 driven in rotation at a predetermined speed, the other end of this shaft being joined by a Cardan joint 10 to a connecting rod 11 the other end of which is joined by a second cardan joint to a fixed shaft 13 in alignment with the axis of the plate. The adjustment of the eccentricity of the bore in which the shaft 8 is mounted permits adjustment of the speed of translational movement of the cutting guide parallel to the rod at the moment when the cut is made.

5 Claims, 2 Drawing Figures

CUTTING GUIDE FOR MACHINES FOR PRODUCING RODS, PARTICULARLY FOR CIGARETTE MACHINES

BACKGROUND OF THE INVENTION

The present invention relates to machines producing continuous rods, in which a product, for example tobacco, is distributed as a continuous rod, which is then wrapped in a continuous cover, that is to say paper in the case of cigarette machines, unwinding in the same direction and at the same speed as the rod.

This rod is then usually cut into pieces of equal length with the aid of cutting equipment.

The present speed of cigarette machines corresponds to the production of several thousand cigarettes per minute, and consequently the speed of travel of the rod amounts to several hundred metres per minute.

The cutting equipments used generally comprise a table rotating about its axis and carrying a blade of slight thickness, which cuts up the rod while moving at the same speed as the latter. In order that the cut may be perpendicular to the rod and in order that it may be a clean cut, it is indispensable that during the passage of the cutter in the rod the latter and also the cutter blade should be guided and supported. This guidance is effected by two side pieces situated one on each side of the cutter and known as cutting guides. These cutting guides must obviously accompany the cutter and consequently must move at the same speed as the rod during the cutting.

The most usual drive for the cutting guides is composed of a device performing a reciprocating movement with the aid of a connecting rod driven by the eccentric crank pin of a rotating plate. The great disadvantage of this device is that at a speed of several thousand cigarettes per minute it is subjected to very great accelerations and gives rise to considerable vibration, which is propagated throughout the machine.

Devices have already been proposed which comprise only elements performing uniform continuous displacement or rotation; these are devices comprising a plate or chain carrying a plurality of cutting guides and having a tangential speed equal to that of the rod. The existence of a plurality of cutting guides which have to be spaced exactly to coincide with the length desired for the cigarette constitutes a considerable restriction both in the obtaining of the exact spacing and in respect of adaptation to products of different lengths.

Devices have also been proposed in which the cutting guide moves while remaining constantly parallel to itself and perpendicular to the cigarette rod, turning about an axis at a uniform tangential speed equal to the speed of travel of the rod.

SUMMARY OF THE INVENTION

The device according to the present invention is a device of this kind which is characterized in that the cutting guide is fixed on the end of a shaft rotating freely in an eccentric bore provided in a plate driven in rotation at a predetermined speed, the other end of this shaft being joined by a cardan joint to a connecting rod the other end of which is joined by a second cardan joint to a fixed shaft in alignment with the axis of the plate.

In this way, in the course of the rotation of the plate the cutting guide remains parallel to itself.

The rotationally driven plate rotates at a speed such that is makes one complete revolution during the advance of the rod corresponding to the length L of a cigarette.

If E is the offset between the axis of the rotationally driven plate and the axis of the shaft carrying the cutting guide, in order that the tangential speed of the cutting guide may be equal to the speed of travel of the rod it is necessary that the offset E should be adjusted to the value given by the equation $2 \pi E = L$.

BRIEF DESCRIPTION OF THE DRAWING

The characteristics of the invention will be clear from the description given below with reference to the accompanying drawing, which is given by way of example.

Figure 1:
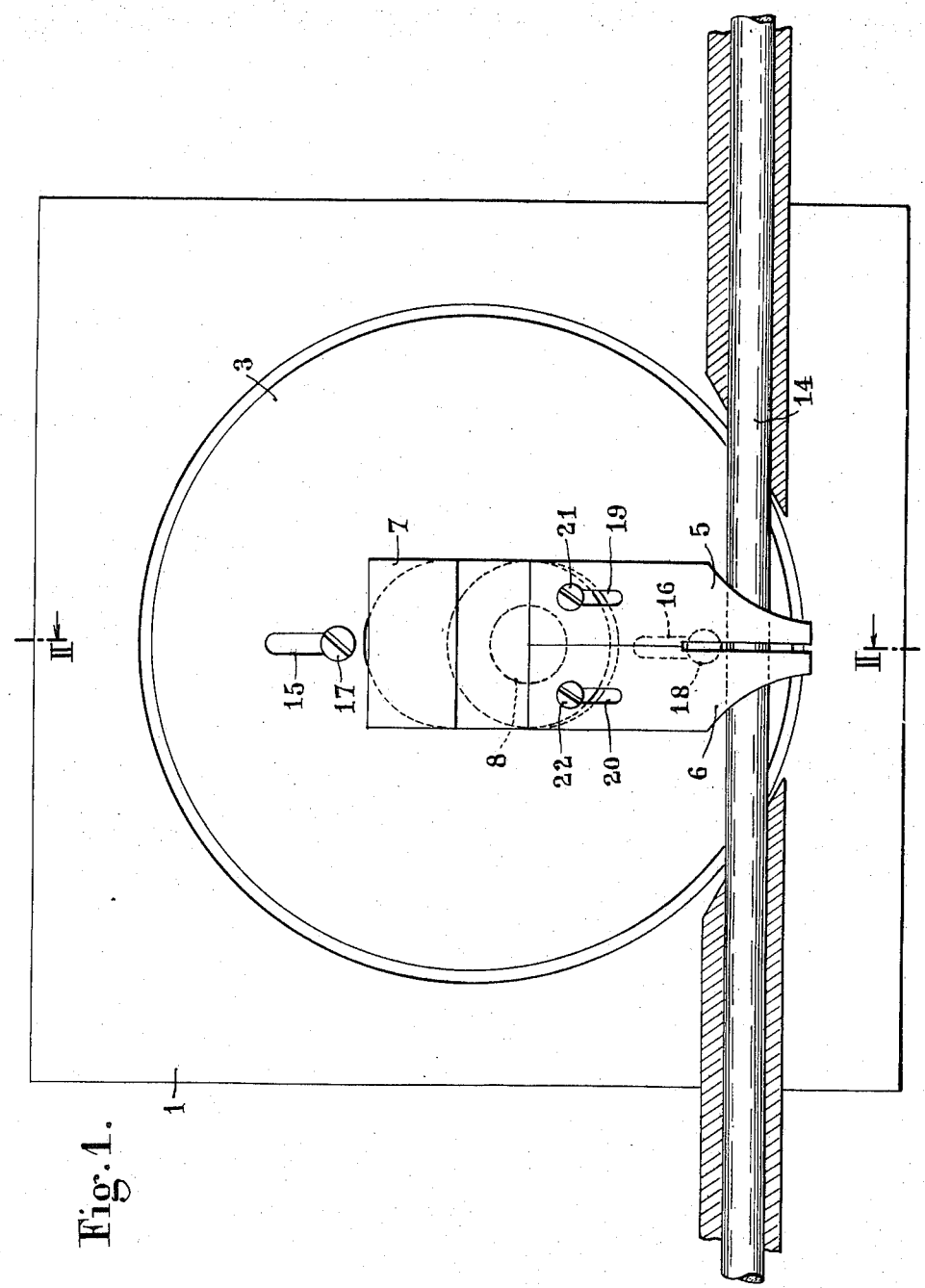
FIG. 1 is a view in elevation.
Figure 2:
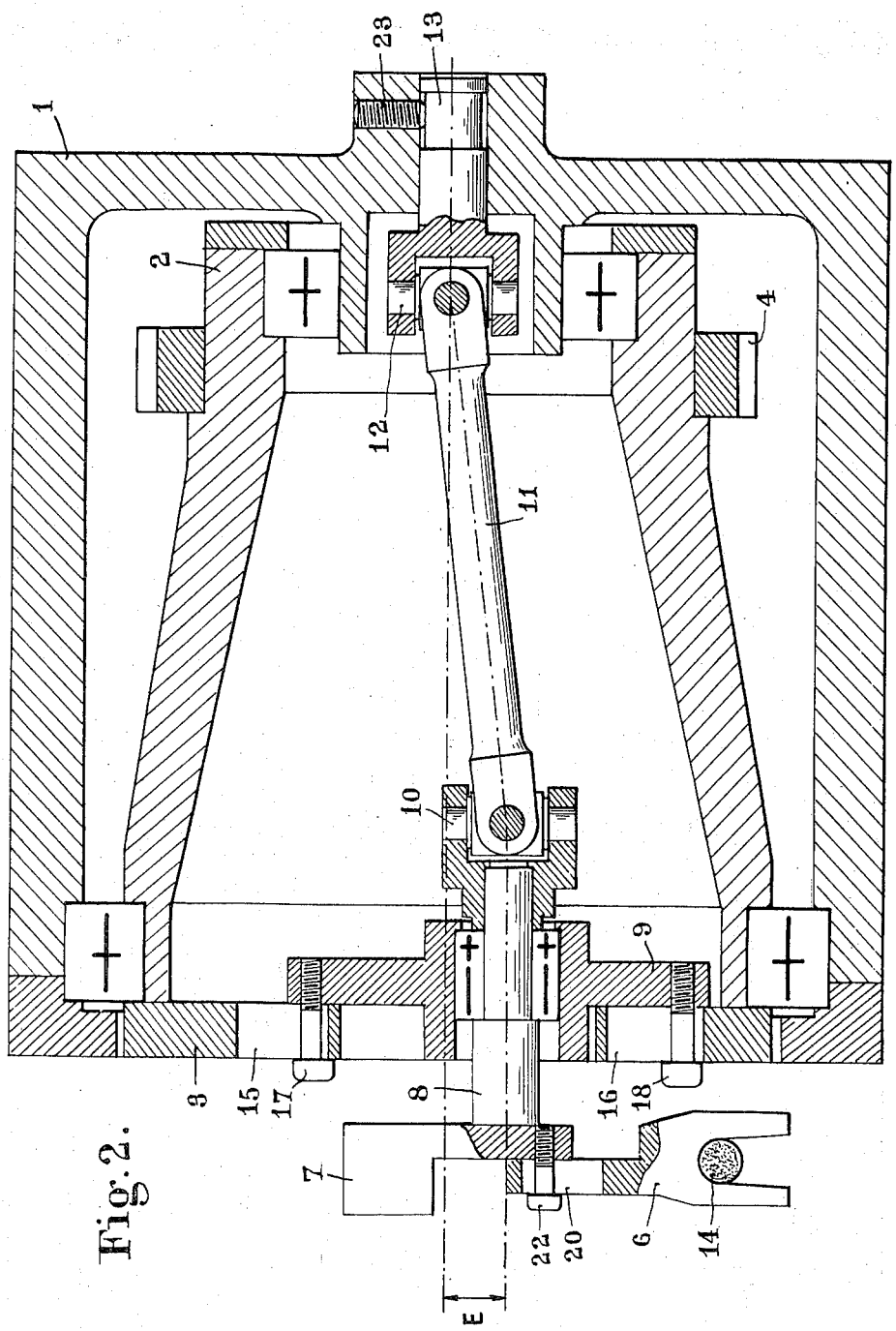
FIG. 2 is a view in section on the line II—II in FIG. 1.

DESCRIPTION OF THE PREFERRED EMBODIMENT.

By means of bearings a fixed frame 1 supports the cylindrical part 2 which carries the plate 3. This assembly is driven in rotation by means of the pinion 4.

The open cutting guides 5 and 6 are fixed on the plate 7, which is fastened to the shaft 8, the latter being free to turn in the bearing 9 fixed on the plate 3. A shaft 8 is connected by the cardan joint 10 to a connecting rod 11 the other end of which is connected by the cardan joint 12 to the shaft 13, which is secured in the frame 1 and the axis of which coincides with the axis of the assembly comprising the parts 2 and 3.

The bearing 9 and the shaft 8 are offset by the distance E in relation to the axis of the assembly comprising the parts 2 and 3.

The pinion 4 makes one complete revolution while the rod of tobacco advances by the length of one cigarette; the same is true of the plate 3, the shaft 8, and the cutting guides 5 and 6.

The shaft 8 describes around the axis of the plate 3 a circle having a radius E, and all the points which are solid therewith, particularly all the points of the cutting guides, describe circles having a radius E which are deducted by translation from one another. The cutting guides thus move parallel to themselves.

For example, if the cigarette rod 14 is horizontal and the cutting guides are disposed above this rod, cutting must take place when the cutting guides 5 and 6 occupy their lowest position, tangent to the rod 14.

If the length L of the cigarette varies, the eccentricity E must be varied in order to give it the value defined by the equation $2\pi E = L$. This eccentricity can be varied by displacing the bearing 9, and consequently the shaft 8, in relation to the plate 3; the displacement of the bearing 9 is possible because of the buttonholes 15 and 16. The screw 23 locking the shaft 13 must be unscrewed in order to enable this shaft to slide in its bore when the bearing 9 is moved. The plate 9 is then fixed with the desired eccentricity by means of the bolts 17 and 18.

The cutting guides 5 and 6 are then positioned correctly in relation to the rod 14 by moving them in the correct direction on the plate 7 of the shaft 8 by means of the vertical buttonholes 19 and 20 and bolts 21 and 22.

The embodiment which has been described is given purely by way of indication and without limitation in any way, and numerous modifications may be made, particularly to the method of adjustment when the length of the cigarette varies, without departing from the scope of the invention.

I claim:

1. A cutting device moving while remaining constantly parallel to itself and perpendicular to a cigarette rod to be cut, said device turning about an axis at a uniform tangential speed equal to the speed of travel of the rod, comprising a fixed frame, a circular plate rotatably mounted in said frame, means driving in rotation said circular plate in said fixed frame, a first shaft perpendicular to said plate freely rotating in an eccentric bore provided in said plate, a cutting guide fixed at the outer end of said first shaft, a second shaft perpendicular to said plate in alignment with the axis of the plate and mounted to said frame, a third shaft and two universal joints connecting the respective ends of said third shaft to the inner ends of the said first and second shafts.

2. A cutting device comprising a frame, a conical part rotatably mounted in said frame, means for driving in rotation said conical part about its axis in said frame, a plate closing the front portion of the conical part and rotationally fixed to said part, a fixed shaft mounted in the frame along the axis of rotation of the conical part, a shaft parallel to the fixed shaft and mounted in an eccentric bearing of the plate, a third shaft connected by respective cardan joints to the two aforesaid shafts, and a cutting guide fixed to the end of said third shaft.

3. A cutting device according to claim 2, characterized by means permitting variation of the eccentricity of the eccentric bearing in which is mounted the shaft to the end of which the cutting guide is fixed.

4. A cutting device according to claim 3, characterized in that it comprises means permitting displacement of the cutting guide parallel to itself at the end of the shaft to which it is fixed.

5. A cutting device according to claim 3, characterized in that it comprises means enabling the fixed shaft mounted in the frame to slide parallel to itself in its fastening.

* * * * *